US011255242B2

United States Patent
Rooney et al.

(10) Patent No.: US 11,255,242 B2
(45) Date of Patent: Feb. 22, 2022

(54) SYSTEM AND PROCESS FOR DELIVERING CONTROLLED QUANTITIES OF AMMONIA TO AMMONIA-CONSUMING DEVICES

(71) Applicant: ExxonMobil Chemical Patents Inc., Baytown, TX (US)

(72) Inventors: Mark A. Rooney, Pasadena, TX (US); Venkatesh Subramania, Houston, TX (US); Robert C. Thiets, Webster, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/975,367

(22) PCT Filed: Feb. 8, 2019

(86) PCT No.: PCT/US2019/017211
§ 371 (c)(1),
(2) Date: Aug. 24, 2020

(87) PCT Pub. No.: WO2019/168652
PCT Pub. Date: Sep. 6, 2019

(65) Prior Publication Data
US 2020/0400055 A1  Dec. 24, 2020

Related U.S. Application Data

(60) Provisional application No. 62/635,634, filed on Feb. 27, 2018.

(30) Foreign Application Priority Data

May 15, 2018  (EP) ..................................... 18172339

(51) Int. Cl.
*F01N 3/20* (2006.01)
*B01D 53/86* (2006.01)
*B01D 53/90* (2006.01)

(52) U.S. Cl.
CPC ......... *F01N 3/208* (2013.01); *B01D 53/8696* (2013.01); *B01D 53/90* (2013.01);
(Continued)

(58) Field of Classification Search
CPC .. F01N 3/208; F01N 2610/06; F01N 2610/10; F01N 2560/026; F01N 2610/02;
(Continued)

(56) References Cited

U.S. PATENT DOCUMENTS 4,876,856 A * 10/1989 Iishiki et al. ......... F01D 15/005
60/671
5,296,206 A  3/1994 Cho et al.
(Continued)

FOREIGN PATENT DOCUMENTS

WO  2016/045908 A  3/2016

*Primary Examiner* — Brandon D Lee (57) ABSTRACT

Centralizing the handling and manipulating of vaporization medium to a single subsystem that supplies multiple ammonia vaporizers allows for efficient and effective production of a corresponding vaporized ammonia stream containing a controlled quantity of ammonia. These vaporized ammonia streams can then be used in conjunction with ammonia-consuming devices to reduce NOx in NOx-containing exhaust streams from multiple furnaces.

25 Claims, 3 Drawing Sheets

(52) U.S. Cl.
CPC ......... *B01D 2251/2062* (2013.01); *F01N 2560/026* (2013.01); *F01N 2610/02* (2013.01); *F01N 2610/06* (2013.01); *F01N 2610/10* (2013.01); *F01N 2610/14* (2013.01)

(58) Field of Classification Search
CPC ......... F01N 2610/14; F01N 2610/08; B01D 53/8696; B01D 53/90; B01D 2251/2062; B01D 2255/20723; B01D 2255/20776; B01D 2258/01; B01D 2258/0241; B01D 2258/0291; B01D 53/8631; B01D 2255/20746; B01D 2255/50; B01D 2258/0233; B01D 2258/0283; Y02T 10/12

See application file for complete search history.

(56) References Cited

U.S. PATENT DOCUMENTS

| | | | |
|---|---|---|---|
| 2010/0061907 A1* | 3/2010 | Sun | B01D 53/8625 |
| | | | 423/239.1 |
| 2013/0031910 A1* | 2/2013 | Merchant | B01D 53/8631 |
| | | | 60/772 |
| 2013/0156671 A1* | 6/2013 | Moyeda | B01D 53/8631 |
| | | | 423/235 |
| 2013/0259755 A1* | 10/2013 | Kim | B01D 53/9431 |
| | | | 422/111 |
| 2016/0376956 A1 | 12/2016 | Kulkarni et al. | |
| 2017/0058742 A1 | 3/2017 | Zhang et al. | |
| 2018/0078897 A1* | 3/2018 | Chung | B01D 53/56 |

\* cited by examiner

SYSTEM AND PROCESS FOR DELIVERING CONTROLLED QUANTITIES OF AMMONIA TO AMMONIA-CONSUMING DEVICES

CROSS-REFERENCE OF RELATED APPLICATIONS

Priority

This application is a National Phase Application claiming priority to P.C.T. Patent Application Serial No. PCT/US2019/017211, filed Feb. 8, 2019, which claims priority to and the benefit of U.S. Provisional Application No. 62/635,634, filed Feb. 27, 2018, and EP 18172339.6 which was filed May 15, 2018, the disclosures of which are incorporated herein by reference.

FIELD

This disclosure relates to the distribution of ammonia to ammonia-consuming devices, to systems for carrying out such distributions, to ammonia distribution processes utilizing such systems, and to NOx reduction methods utilizing such processes. In particular, this disclosure relates to methods and systems for distributing ammonia to multiple NOx-reducing devices producing NOx-containing gas streams to reduce NOx concentration therein. This disclosure can be particularly useful in, e.g., distributing precise quantities of ammonia to multiple selective catalytic reduction units located in multiple furnaces that produce exhaust gas streams containing NOx at variable levels located in the same production facility.

BACKGROUND

High-temperature combustion of fuels (e.g., coal, hydrogen, natural gas, fuel gases, fuel oils, and the like) with air can result in the chemical reaction between nitrogen and oxygen to form various nitrogen oxides collectively called NOx, especially NO and $NO_2$, in the exhaust gas. Stringent environmental laws and regulations exist worldwide to curb the discharge of NOx into the atmosphere.

Industries have made continuing efforts over the years to develop methods and systems to abate NOx from exhaust gas streams produced by fuel burning to the prescribed levels by laws and regulations prior to discharge into the atmosphere. For example, modern gas engine powered automobiles are typically equipped with a catalytic converter in the exhaust gas pipeline to convert at least a portion of the NOx produced in the internal combustion chamber to diatomic nitrogen. Power plants burning coal or natural gas produce large quantity of flue gas comprising NOx, which is typically abated by selective catalytic reduction ("SCR") involving the injection of a reducing agent (such as ammonia or urea) into the flue gas stream to reduce NOx on contact with catalyst in the SCR beds. Chemical plants operating fuel-burning furnaces have used SCR devices to abate NOx from the exhaust gas streams. In the case of using ammonia as the reducing agent, it is believed that $NH_3$, NO, $NO_2$, and $O_2$ react in the presence of the SCR catalyst under the SCR conditions to produce $N_2$ and $H_2O$, thereby reducing the quantity of NOx in the treated exhaust stream.

Figure 1:
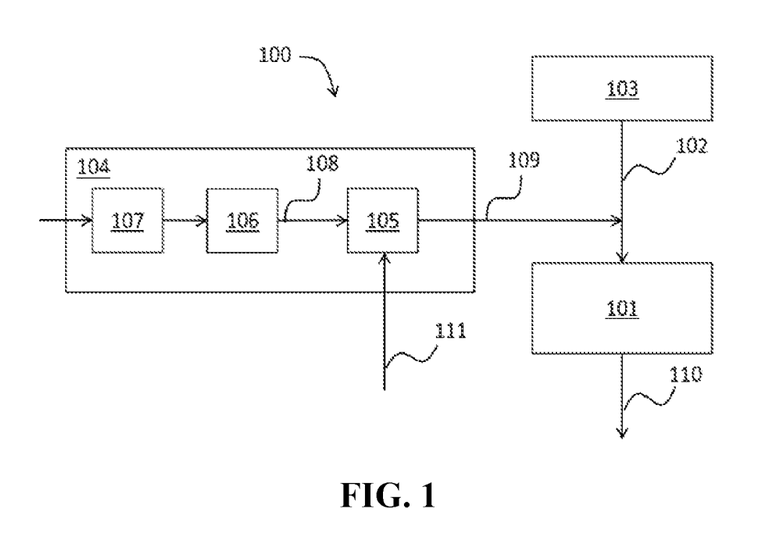
FIG. 1 schematically illustrates an exemplary system that utilizes a SCR bed to treat a NOx-containing exhaust stream from a fuel combustion device (e.g., a furnace) with a vaporized ammonia stream supplied from an ammonia vaporizer in an ammonia supply system.

FIG. 1 schematically illustrates an exemplary system 100 that utilizes a SCR bed 101 to treat a NOx-containing exhaust stream 102 from a fuel combustion device 103 (e.g., a furnace) with a vaporized ammonia stream 109 supplied from an ammonia vaporizer 105 in an ammonia supply system 104. The ammonia supply system 104 comprises an air blower 107, an air heater 106 and an ammonia vaporizer 105. A heated air stream 108 supplied from the air heater 106 into the ammonia vaporizer 105 vaporizes a liquid aqueous ammonia solution stream 111 supplied to the ammonia vaporizer 105 to obtain the vaporized ammonia stream 109 comprising heated air and vaporized ammonia, which is then supplied into the NOx-containing exhaust stream 102 upstream of the SCR bed 101 to form a gas mixture comprising $NH_3$, NOx, and $O_2$. On contact with the catalyst in the SCR bed, $NH_3$, NO, $NO_2$, and $O_2$ react to produce $N_2$ and $H_2O$, thereby abating the NOx concentration in the treated exhaust gas stream 110.

In SCR methods, a continuous supply of the vaporized ammonia stream 109 comprising a proper quantity of ammonia is highly desired in order to reduce NOx in the exhaust gas stream without interruption to a NOx concentration level satisfying environmental regulations without introducing excessive ammonia into the treated exhaust gas stream. In the foregoing system 100, consistent and reliable supply of the vaporized ammonia stream 109 can be achieved by redundancy of air blower and air heater, which are prone to failure and require periodic downtime for maintenance. In certain applications, three air blowers and three heaters are provided in each ammonia supply system 104 to accommodate situations where one is in normal operation, one on maintenance, and one standby. In a large plant operating a large number of furnaces each equipped with a SCR bed for NOx abatement which consumes ammonia, providing an individual ammonia supply system illustrated in FIG. 1 to each furnace can result in a huge number of redundant equipment, which are capital-intensive and occupy large area and space. Therefore, there is a need of an improved ammonia supply system for multiple ammonia-consuming devices such as SCR beds in multiple fuel-burning furnaces. This disclosure satisfies this and other needs.

SUMMARY

It has been found that by providing a centralized vaporization medium subsystem ("CVMS") adapted for supplying a source stream of vaporization medium, providing a separate ammonia vaporizer for each designated ammonia-consuming device, and supplying a separate stream of vaporization medium from the source stream, one can efficiently and effectively supply a vaporized ammonia stream containing a controlled quantity of ammonia to each designated ammonia-consuming device with a reduced number of equipment such as air blowers and heaters, especially where large numbers of ammonia-consuming devices are involved, and redundancy of equipment is desired.

Thus, a first aspect of this disclosure relates to a process for delivering controlled quantities of ammonia to multiple ammonia-consuming devices, the process comprising: (I) supplying a vaporization medium from a centralized vaporization medium subsystem; (II) providing a separate ammonia vaporizer for each of the ammonia-consuming devices; (III) supplying a separate stream of vaporization medium from the centralized vaporization medium subsystem to each of the ammonia vaporizers; (IV) supplying an ammonia supply stream comprising a controlled quantity of ammonia to each of the ammonia vaporizers; (V) obtaining a vaporized ammonia stream from each of the ammonia vaporizers; and (VI) supplying one of the vaporized ammonia stream to one of the ammonia-consuming devices.

A second aspect of this disclosure relates to a system comprising: (A) a centralized vaporization medium subsystem; (B) multiple ammonia-consuming devices; (C) a separate ammonia vaporizer for each of the ammonia-consuming devices adapted for (i) receiving a separate stream of the vaporization medium from the centralized vaporization medium subsystem, (ii) receiving an ammonia supply stream from an ammonia source, and (iii) supplying a vaporized ammonia stream to one of the ammonia-consuming device; and (D) an ammonia-delivery subsystem comprising a pump for delivering a controlled quantity of ammonia from the ammonia supply stream to each ammonia vaporizer.

BRIEF DESCRIPTION OF THE DRAWINGS

The following figures are included to illustrate certain non-exclusive embodiments. The subject matter disclosed is capable of considerable modifications, alterations, combinations, and equivalents in form and function, as will occur to those skilled in the art and having the benefit of this disclosure.

DETAILED DESCRIPTION

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, the steps in a process may be conducted sequentially in the order as they are listed, with or without overlapping between one or more other step(s), or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contain a certain level of error due to the limitation of the technique and equipment used for making the measurement.

As used herein, the indefinite article "a" or "an" shall mean "at least one" unless specified to the contrary or the context clearly indicates otherwise. Thus, embodiments using "a given device" include embodiments where one, two or more such given devices is used, unless specified to the contrary or the context clearly indicates that only one such given device is used.

As used herein, "wt %" means percentage by weight, "vol %" means percentage by volume, "mol %" means percentage by mole, "ppm" means parts per million, and "ppm wt" and "wppm" are used interchangeably to mean parts per million on a weight basis. All "ppm" as used herein are ppm by weight unless specified otherwise. All concentrations herein are expressed on the basis of the total amount of the composition in question unless specified otherwise. All ranges expressed herein should include both end points as two specific embodiments unless specified or indicated to the contrary.

"NOx" as used herein means any chemical compound consisting of elements nitrogen and oxygen and mixtures thereof. Examples of NOx include but are not limited to NO and $NO_2$, the two oxides of nitrogen that are typically considered as air pollutants if released into or produced in the atmosphere.

"Ammonia-consuming device" as used herein means any device that receives ammonia and consumes ammonia in a chemical or physical process. An example of an ammonia-consuming device is an industrial furnace equipped with a SCR bed adapted for receiving ammonia for the purpose of reducing NOx contained in the exhaust gas produced from fuel burning in the furnace.

This disclosure relates to processes and systems including equipment/steps for delivering controlled quantities of ammonia to multiple ammonia-consuming devices. Such ammonia-consuming device can comprise a SCR catalyst bed adapted for abating NOx contained in gas streams, such as the exhaust gas streams produced from processes/equipment involving (i) fuel combustion using air as an oxidizing agent, particularly those operating at a high temperature and/or high pressure, (ii) other high-pressure and/or high-temperature operations in the presence of oxygen and nitrogen; and (iii) oxidation of nitrogen-containing materials, especially at a high temperature and/or pressure. Non-limiting examples of such equipment include internal combustion engines, boiler furnaces, hydrocarbon steam-cracking furnaces, coal, gas and oil-fired steam boilers for electric power plants, process heaters, incinerators, coal-fired utility boilers, glass furnaces, cement kilns, oil field steam generators, catalyst regenerator associated with a fluidized catalytic cracking unit (an "FCC" unit), and so forth. The following description of this disclosure will focus on industrial furnaces such as hydrocarbon steam-cracking furnaces and fuel-combusting steam boilers as the ammonia-consuming devices, even though the inventive process and system can be likewise used for other applications.

In this disclosure, a centralized vaporization subsystem is utilized in connection with multiple ammonia-delivery subsystems to effect delivery of ammonia to multiple ammonia-consuming devices. Certain aspects of the subsystems will be specified in the following sections of the description.

I. The Centralized Vaporization Subsystem

In the processes of this disclosure, ammonia is desirably delivered in vapor state to the ammonia-consuming devices. The vaporized ammonia is desirably produced by vaporizing a liquid-containing ammonia source material in a vaporizer by a vaporization medium. Any suitable gas can be used as the vaporization medium, including but not limited to air, nitrogen, steam, and mixtures thereof, and the like. Preferred vaporization media are air, steam, and mixtures thereof. Ambient air can be used as the source for the vaporization medium, which is typically pressurized and heated before being supplied to the vaporizers. Steam sources generally available in industrial plants at various pressures and temperatures, such as high-pressure steam and super-high-pressure steam can be advantageously used as the source of suitable vaporization medium as well, which are typically depressurized and cooled before being supplied to the vaporizers. In the processes and systems of this disclosure, a centralized vaporization medium subsystem ("CVMS") is utilized to provide the needed vaporization medium to multiple vaporizers at the desirable pressure, temperature and flow rate.

Desirably, the vaporization medium stream supplied to any of the ammonia vaporizers from the CVMS can have a temperature in a range of from $T1$ to $T2°$ C., where $T1$ and $T2$ can be, independently, 150, 160, 180, 200, 220, 240, 250, 260, 280, 300, 320, 340, 350, 360, 380, 400, 420, 440, 450, 460, 480, or 500, as long as $T1<T2$. Desirably, the vaporization medium stream supplied to any of the ammonia vaporizers from the CVMS can have an absolute pressure in a range from $P1$ to $P2$ kilopascal ("kPa"), where $P1$ and $P2$ can be, independently, 120, 150, 200, 250, 300, 350, 400, 450, 500, 550, 600, 650, 700, 750, 800, 850, 900, 950, 1000, 1100, 1200, 1300, 1400, or 1500, as long as $P1<P2$. As described below, the temperatures and pressures of the streams supplied to the multiple vaporizers can vary from vaporizer to vaporizer.

The temperature and pressure of each of the multiple, separate streams of vaporization medium supplied to the multiple ammonia vaporizers can be conveniently derived from a single source stream produced in the CVMS. As long as an individual vaporization medium stream supplied into a given vaporizer is sufficient to vaporize the ammonia source material in the given vaporizer and convey the vaporized ammonia stream into the destination ammonia-consuming device without substantial condensation of ammonia, the exact temperature, pressure, and flow rate of the vaporization medium stream are not critical and can vary in large ranges for any ammonia vaporizer, provided however, in preferred embodiments, the temperature and pressure are maintained within the ranges described above. Precise control of the pressure, temperature, and flow rate of the vaporization medium stream to the vaporizers are not required. Indeed, the temperatures, pressures, and flow rates of the multiple vaporization medium streams supplied to multiple vaporizers can vary from vaporizer to vaporizer in a large range to suit the specific needs of the various vaporizers and ammonia-consuming devices. This allows for the use of pipelines at various length to supply the multiple vaporization medium streams to the multiple vaporizers at various distances from the CVMS. Multiple vaporization medium streams divided and derived from a central source stream produced by the CVMS can suit the needs of multiple vaporizers and the end ammonia-consuming devices at the same time.

Figure 2:
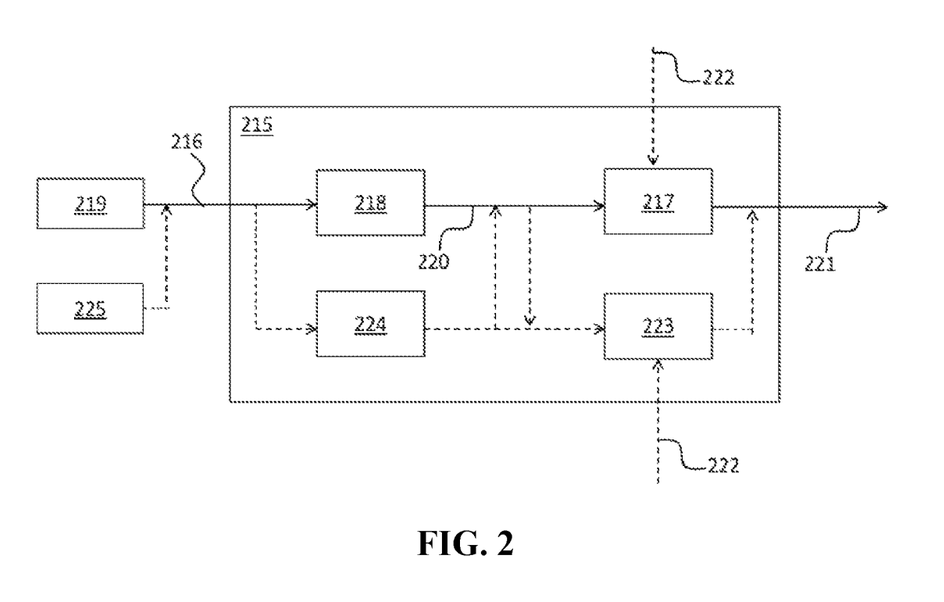
FIG. 2 schematically illustrates an exemplary of this disclosure suitable for handling an air stream as a vaporization medium source stream.

FIG. 2 schematically illustrates an exemplary CVMS 215 of this disclosure suitable for handling an air stream 216 as a vaporization medium source stream. The illustrated CVMS 215 includes a heater 217 and an air blower or regulator 218 connected to an air source 219. The air source 219 can be an ambient air source or a compressed air source (e.g., pressurized plant utility or instrument air).

In the illustrated CVMS 215, the air source 219 supplies an air stream 216 to the air blower or regulator 218. The air blower or regulator 218 changes the pressure of the air (if needed). For example, when the air source 219 is ambient air, the air blower or regulator 218 is an air blower that compresses the air stream 216 to the desired pressure. Exemplary air blowers include, but are not limited to, centrifugal blowers, air compressors, and the like. In another example, when the air source 219 is compressed air, the air blower or regulator 218 can be an air blower or compressor if the pressure of the compressed air needs to be increased further or a regulator if the compressed air needs to be metered into the CVMS 215 at a reduced pressure.

The air blower or regulator 218 supplies a compressed air stream 220 to the heater 217, which increases the temperature of the compressed air stream 220 to produce a source stream of heated, compressed air 221. Exemplary heaters 217 include, but are not limited to, electric heaters, heat exchangers, and the like. In some instances, where the heater 217 is a heat exchanger, the heat exchanger can use a high-pressure steam or super-high-pressure steam (HPS/SHPS) steam stream 222 as the stream providing the indirect heat transfer to the air stream 220.

The source stream of heated, compressed air 221 from the CVMS 215 then supplies separate streams of heated, compressed air for each of the ammonia vaporizers.

The heater 217 and the air blower or regulator 218 can be prone to failure and, therefore, are routinely inspected, serviced or replaced, which requires taking the heater 217 and the air blower or regulator 218 offline from time to time. Therefore, the CVMS 215 can include a redundancy for the heater 217 and the air blower or regulator 218, which are illustrated as second heater 223 and second air blower or regulator 224, respectively. Illustrated is a single redundancy for each component, but additional redundant components may be included in the CVMS 215. Redundancies allow for continuous operation of the CVMS 215 when a component of the CVMS 215 needs to be taken offline, which can be scheduled maintenance or an unscheduled repair.

While it is preferred that the heater 217 and second heater 223 are the same or similar type of heater, they may be different. For example, the heater 217 can be an electric heater, and the second heater 223 can be a heat exchanger, or vice versa.

An additional redundancy relative to the exemplary CVMS 215 includes a second air source 225. The second air source 225 can supply the air blower or regulator 218 or the second air blower or regulator 224 with an air stream 216. The second air source 225 can be the same or different from the air source 219. In instances where the air sources 219 and 225 are different, the downstream air blower or regulator 218 or 224 should be proper for either compressing or decompressing based on the air sources in use 219 or 225.

The dashed lines in FIG. 2 illustrate conduits for conveying the vaporization medium to one or more of the redundant components of the CVMS 215. Exemplary flow configurations include, but are not limited to, the following.

(A) The air source 219 supplies the air stream 216 to the air blower or regulator 218, which supplies the compressed air stream 220 to the heater 217 to produce the source stream of heated, compressed air 221.

(B) The air source 219 supplies the air stream 216 to the second air blower or regulator 224, which supplies the compressed air stream 220 to the heater 217 to produce the source stream of heated, compressed air 221.

(C) The air source 219 supplies the air stream 216 to the air blower or regulator 218, which supplies the compressed air stream 220 to the second heater 223 to produce the source stream of heated, compressed air 221.

(D) The air source 219 supplies the air stream 216 to the second air blower or regulator 224, which supplies the compressed air stream 220 to the second heater 223 to produce the source stream of heated, compressed air 221.

(E) The second air source 225 supplies the air stream 216 to the air blower or regulator 218, which supplies the compressed air stream 220 to the heater 217 to produce the source stream of heated, compressed air 221.

(F) The second air source 225 supplies the air stream 216 to the second air blower or regulator 224, which supplies the compressed air stream 220 to the heater 217 to produce the source stream of heated, compressed air 221.

(G) The second air source 225 supplies the air stream 216 to the air blower or regulator 218, which supplies the compressed air stream 220 to the second heater 223 to produce the source stream of heated, compressed air 221.

(H) The second air source 225 supplies the air stream 216 to the second air blower or regulator 224, which supplies the compressed air stream 220 to the second heater 223 to produce the source stream of heated, compressed air 221.

In all of the above configurations (A) to (H), the heater can be an electric heater.

In all of the above configurations (A) to (H), the heater can be a heat exchanger utilizing a heating stream such as a HPS/SHPS stream 222.

In all of the above configurations (A) to (H), one of the heaters 217 and 223 can be an electric heater, and the other can be a heat exchanger utilizing a heating stream such as a HPS/SHPS stream 222. In such case of configuration of FIG. 2, preferably the heat exchanger is a backup heater, and the electric heater is a primary heater providing heat most of the time during normal operation.

Valves, pressure meters, sensors, actuators, and the like can be placed anywhere suitable within the CVMS 215 to ensure proper functioning of the CVMS 215.

Figure 3:
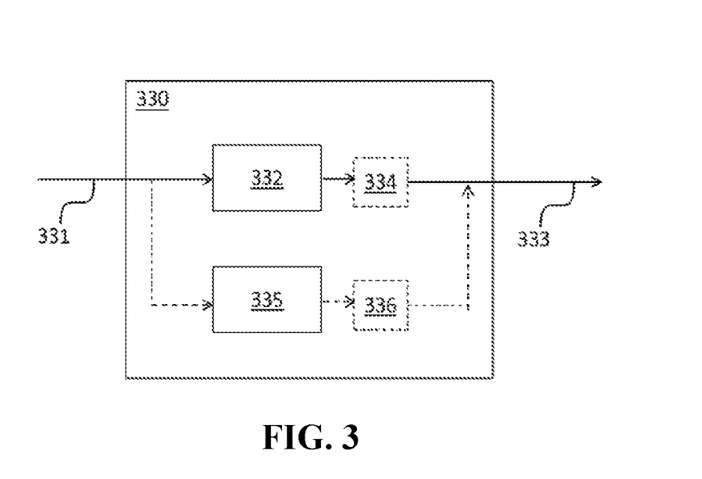
FIG. 3 schematically illustrates an exemplary CVMS of this disclosure suitable for handling a high-pressure steam ("HPS") or super-high-pressure steam ("SHPS") stream as a vaporization medium source stream.

FIG. 3 schematically illustrates an exemplary CVMS 330 of this disclosure suitable for handling a high-pressure steam or super-high-pressure steam (HPS/SHPS) stream 331 as a vaporization medium source stream.

The illustrated CVMS 330 uses a regulator 332 (e.g., a letdown valve(s)) to change the temperature and/or pressure of a HPS/SHPS stream 331 and produce a source stream of steam 333. The resultant source stream of steam 333 then supplies the separate streams of vaporization medium for each of the ammonia vaporizers.

Where the HPS/SHPS stream 331 is super-high-pressure steam, the CVMS 330 can further include a regulator such as a desuperheater 334 downstream of the regulator 332 to further reduce the temperature of the super-high-pressure steam. Because the desuperheater 334 is optional, it is shown on FIG. 3 as a dash outline box. Superheated steam is a steam stream that has a temperature higher than its saturation temperature. A desuperheater is a device that reduces the temperature of a superheated steam stream to a temperature close to its saturation temperature, usually by injecting atomized droplets of water into the flow of superheated steam. The direct contact and evaporation of the droplets reduce the temperature of the superheated steam stream. Desuperheaters may take advantage of a venturi design which facilitates the atomization of the cooling water. Useful desuperheaters in this disclosure include but are not limited to ejector atomizing desuperheaters, attemperator desuperheaters, surface absorption desuperheaters, and mechanical atomizing desuperheaters. A desuperheater is needed if the HPS/SHPS stream has a temperature that is too high for the purpose of indirectly heating the evaporation medium stream via a heat exchanger to the proper temperature. Thus, where an HPS is used, a single desuperheater may be employed to reduce its temperature to the desired level suitable for heating the evaporation medium stream to the proper temperature; in the case of SHPS, two desuperheaters may be employed in series to cool the steam stream.

As with the CVMS 215 of FIG. 2, redundancy of the components of the CVMS 330 can be used to allow for continuous operation of the CVMS 330 when a component of the CVMS 330 needs to be taken offline, which can be scheduled maintenance or an unscheduled repair. Therefore, the CVMS 330 can include a second regulator 335 optionally with a corresponding downstream second desuperheater 336.

Exemplary flow configurations include, but are not limited to, the following.

(A) The HPS/SHPS stream 331 is supplied to the regulator 332 (and optionally then the desuperheater 334 for super-high-pressure steam) to produce the source stream of steam 333.

(B) The HPS/SHPS stream 331 is supplied to the second regulator 335 (and optionally then the second desuperheater 336 for super-high-pressure steam) to produce the source stream of steam 333.

Illustrated is a single redundancy for each component of the CVMS 330, but additional redundant components may be included in the CVMS 330.

Valves, pressure meters, sensors, actuators, and the like can be placed anywhere suitable within the CVMS 330 to ensure proper functioning of the CVMS 330.

Figure 4:
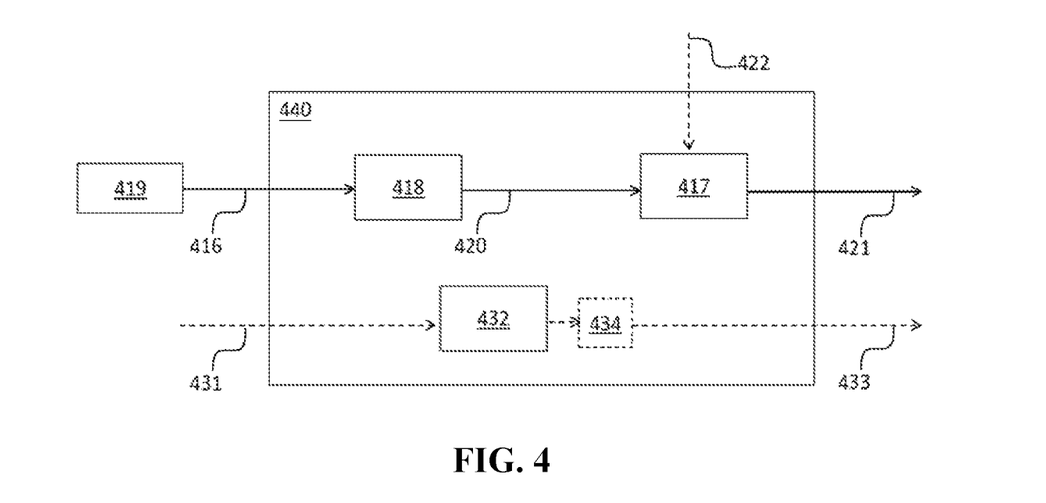
FIG. 4 schematically illustrates yet another exemplary CVMS of this disclosure using both an air stream and a HPS/SHPS stream.

FIG. 4 schematically illustrates yet another exemplary CVMS 440 using both an air stream 416 and a HPS/SHPS stream 431. In this example, either the air stream 416 or the HPS/SHPS stream 431 is the primary vaporization medium source stream and the other is the redundant vaporization medium source stream. FIG. 4 specifically illustrates the embodiment with the air stream 416 as the primary vaporization medium source stream and the HPS/SHPS stream 431 as the redundant vaporization medium source stream. However, the alternative with a similar configuration is suitable for use as a CVMS of this disclosure.

In this exemplary CVMS 440, the primary mode of operation uses an air source 419 to supply an air blower or regulator 418 with an air stream 416 to produce a compressed air stream 420. The compressed air stream 420 is supplied to and heated by a heater 417 to produce a source stream of heated, compressed air 421 that supplies the separate streams of vaporization medium for each of the ammonia vaporizers.

As described in FIG. 2, when the heater 417 is a heat exchanger, a HPS/SHPS stream 422 can be supplied thereto for proper heating operations.

Additionally, the air supply 419 can be ambient air or compressed air and the downstream hardware and operations would be as described in FIG. 2.

In the secondary or redundant mode of operation, a HPS/SHPS stream 431 is supplied to a regulator 432 (and optionally then the desuperheater 434 for super-high-pressure steam) to produce a source stream of steam 433.

While not necessarily preferred, each of the components of the CVMS 440 can optionally have a redundant component. Additionally, valves, pressure meters, sensors, actuators, and the like can be placed anywhere suitable within the CVMS 440 to ensure proper functioning of the CVMS 440.

Centralization of the handling and production of the vaporization medium reduces the redundancies needed for continuous, uninterrupted operation. For example, a large plant operating a large number (e.g., 10-20) of fuel combustion devices can achieve continuous operation with one or two redundancies for each component in a CVMS (e.g., 2 or 3 air blowers or regulators 218 and 2 or 3 heaters 217 in total in the exemplary CVMS 215 of FIG. 2; 2 or 3 regulators 332 and optionally two desuperheaters 334 in total in the exemplary CVMS 330 of FIG. 3; and one or two air blower or regulator 418, one heater 417, one regulator 432, and optionally one desuperheater 434 in the exemplary CVMS 440 of FIG. 4). In contrast, if a stand-alone system illustrated in FIG. 1 were used for each furnace, to reduce NOx emissions from 10-20 fuel combustion devices 103, each being equipped with a SCR bed in a large plant where each fuel combustion device 103 has a dedicated ammonia supply system 104, then 20-60 air blowers 107 and 20-60 air heaters 106 in total are needed. The significant reduction in number of components required to operate the plant significantly reduces equipment capital costs and saves plant space. Moreover, the use of a single CVMS to supply multiple streams of vaporization medium to multiple ammonia-consuming devices can achieve precise control of the quantity of ammonia supplied to any given ammonia-consuming device as described below, all while permitting the temperature, pressure, and/or flow rate of the streams of vaporization medium supplied to the ammonia vaporizer for the ammonia-consuming device to fluctuate in relatively large ranges. This leads to simplicity in design, large operation windows of the components of the CVMS, and high reliability of the CVMS operation.

II. Ammonia Delivery Subsystem and Ammonia Vaporizer

An ammonia delivery subsystem supplies an ammonia vaporizer with an ammonia supply stream comprising a controlled quantity of ammonia. In a facility with multiple furnaces, ammonia can be distributed from an ammonia storage vessel. An ammonia source in an ammonia storage vessel is distributed to the multiple ammonia vaporizers. The ammonia source can be an aqueous ammonia solution preferably having an ammonia concentration in a range from $c1$ to $c2$ wt %, based on the total weight of the ammonia solution, where $c1$ and $c2$ can be, independently, 10, 11, 12, 13, 14, 15, 16, 17, 18, 19, 20, 21, 22, 23, 24, 25, 26, 27, 28, or 29, as long as $c1<c2$. At below 10 wt %, the aqueous ammonia solution would contain large quantity of water and require significantly more vaporization medium to vaporize completely, and the vaporization in the vaporizer can decrease the temperature of the vaporized ammonia stream comprising ammonia and the vaporization medium to a level risking condensation en route to the ammonia-consuming device. Condensation of the vaporized ammonia stream en route from the vaporizer to the ammonia-consuming device is highly undesirable because it results in reduced quantity or unpredictable quantity of ammonia delivered to the ammonia-consuming device. At high concentrations of ammonia (e.g., greater than 29 wt %), the ammonia in the solution can evaporate and change concentration resulting in unpredictable and inconsistent supply of ammonia to the vaporizer and the ammonia-consuming device.

The ammonia aqueous solution can be stored advantageously at close to room temperature, e.g., 25° C. and under ambient pressure, before being supplied to the ammonia vaporizer.

Pumps can be used to distribute the aqueous ammonia solution at controlled quantities to the multiple ammonia vaporizers. Because pumps have moving parts, pumps are more likely to require maintenance than other, non-moving or minimally-moving pieces of equipment like containers and vessels. Therefore, one or more additional pumps can be included in the ammonia delivery subsystem as a redundancy. Suitable valves and other fluid handling components can be included for seamless transition between pumps, so as to provide for a continuous and consistent supply of aqueous ammonia solution to the ammonia vaporizers downstream.

The aqueous ammonia solution can be passed through an in-line ammonia filter to remove particulates from the aqueous ammonia solution that could clog downstream equipment like nozzles. Because filters have a finite lifetime, a redundant in-line ammonia filter can be included with the appropriate valves for controlling fluid flow so that one in-line ammonia filter can be in use while the other is being replaced or regenerated/cleaned.

A controlled valve and/or meter can be included downstream or upstream, preferably downstream, of the in-line ammonia filter. The controlled valve can be used to control the amount of ammonia being supplied to the downstream ammonia vaporizer. Precise control of the quantity of ammonia delivered into the vaporizer, and hence into the destination ammonia-consuming device, is highly desirable, especially in the case where the ammonia-consuming device uses ammonia to abate NOx in an exhaust gas stream by SCR. Under-supply of ammonia to the exhaust gas stream can result in exceedingly high NOx in the exhaust gas, and over-supply of ammonia to the exhaust gas stream results in waste of ammonia, which in and of itself is an air pollutant and irritant if discharged directly into the atmosphere. Unpredictable or inconsistent supply of ammonia into the exhaust gas stream results in fluctuation of NOx in the exhaust gas stream, which is highly undesirable for environmental regulation compliance purposes.

In some instances, sensors can be used in the system to monitor the amount of unreacted ammonia or NOx in the treated exhaust gas exiting the ammonia-consuming device, which are sometimes referred to as ammonia slip and NOx slip, respectively. Ammonia slip can be caused by over-injection of ammonia into the ammonia-consuming device, temperatures too low in the ammonia-consuming device, catalyst degradation in the ammonia-consuming device, or mixtures thereof. NOx slip can be caused by under-injection of ammonia into the ammonia-consuming device. By monitoring the ammonia and/or NOx in the treated exhaust gas, the control valve can be adjusted to supply a more consistent and proper quantity of ammonia to the ammonia-consuming device to minimize both ammonia slip and NOx slip.

In some instances, the amount of NOx in the NOx-containing exhaust stream from the furnace can be measured or calculated. The NOx concentration measurement or calculation can be used to adjust the control sensor for controlling the amount of aqueous ammonia solution to supply the ammonia vaporizer and, consequently, the concentration of ammonia supplied to the ammonia-consuming device.

In another example, a system can include at least one sensor capable of sensing the concentration of NOx in the NOx-containing gas stream upstream and/or downstream of the SCR catalyst bed; and at least one actuator in the ammonia delivery subsystem adapted for controlling the quantity of ammonia supplied to the ammonia vaporizer according to the concentration of NOx sensed by the at least one sensor. The actuator can be a controlled valve.

In some instances, a nitrogen supply stream can also be included upstream of each of the ammonia vaporizers to add nitrogen to the aqueous ammonia solution. Adding nitrogen to the aqueous ammonia solution can enhance the vaporization of ammonia in the downstream ammonia vaporizer, especially when an atomizer is used in the ammonia vaporizer.

Similar to the aqueous ammonia solution, the nitrogen supply stream can be filtered with an in-line nitrogen filter to remove particulates that could clog downstream equipment like nozzles. Additionally, the in-line nitrogen filter can have a parallel in-line nitrogen filter that allows for one filter to off-line for replacement or regeneration/cleaning while maintaining continuous flow through the other filter.

Generally, each ammonia vaporizer can have a corresponding in-line ammonia filter, a corresponding in-line nitrogen filter, a corresponding control valve, and one or more redundancies of the foregoing.

The aqueous ammonia solution optionally with additional nitrogen and a separate stream of vaporization medium from a CVMS are supplied to each ammonia vaporizer. Typically, the stream of vaporization medium is supplied to the ammonia vaporizer upstream of the supplied aqueous ammonia solution. The ammonia vaporizer heats the aqueous ammonia solution to form vaporized ammonia that is diluted and entrained with the vaporization medium, which results in a vaporized ammonia stream. Preferably, all ammonia is in the vapor phase when leaving the ammonia vaporizer and when delivered to the ammonia-consuming device.

In some instances, an atomizer can be used to introduce the aqueous ammonia solution into the ammonia vaporizer to facilitate the vaporization. Generally, atomization forces a fluid stream through nozzles to form a fine spray of liquid droplets. Because the droplets of ammonia from the aqueous ammonia solution have a high surface area to volume ratio, the liquid vaporizes much faster than from a liquid pool or a large stream, enabling complete vaporization in a smaller volume and be carried by the vaporization medium in substantially complete vapor phase to the ammonia-consuming device. Use of an atomizer allows for using an ammonia vaporizer with a smaller internal volume.

As described above, nozzles can be clogged by particulates in the aqueous ammonia solution stream. Accordingly, redundancy of the nozzles for injecting and atomizing the aqueous ammonia solution into the ammonia vaporizer may be desirable to allow for continuous operation.

The vaporization medium serves a second purpose of diluting the vaporized ammonia to avoid condensation and/or oxidation of ammonia (in cases where the vaporization medium is air) in the conduit from the vaporizer to the ammonia-consuming device. A preferred air-to-aqueous ammonia mass ratio can be from 8:1 to 20:1, and more preferably from 12:1 to about 17:1, where air is used as the vaporization medium.

Desirably, the vaporization of the aqueous ammonia solution in the vaporizer does not significantly reduce the temperature and/or pressure of the vaporization media due to the high vaporization medium to ammonia solution mass ratio. Desirably, the vaporized ammonia stream comprising the vaporization medium, ammonia and water vapor exiting the ammonia vaporizer has a temperature in a range from T3 to T4° C., where T3 and T4 can be, independently, 120, 150, 160, 180, 200, 220, 240, 250, 260, 280, 300, 320, 340, 350, 360, 380, 400, 420, 440, 450, 460, 480, or 500, as long as T3<T4. Desirably, the vaporized ammonia stream comprising the vaporization medium, ammonia and water vapor exiting the ammonia vaporizer has an absolute pressure in a range from P3 to P4 kilopascal, where P3 and P4 can be, independently, 120, 150, 200, 250, 300, 350, 400, 450, 500, 550, 600, 650, 700, 750, 800, 850, 900, 950, 1000, 1100, 1200, 1300, 1400, or 1500, as long as P3<P4.

Generally, the ammonia vaporizer as a whole does not have moving parts or other components that are prone to regular maintenance or failure, except the atomization nozzles described above. Therefore, while a redundant ammonia vaporizer can be included in the systems of this disclosure in some embodiments, it is generally not preferred.

A conduit connects the ammonia vaporizer to the ammonia-consuming device. This conduit should be maintained at a temperature (via insulation and/or heating) sufficient to mitigate condensation of the vaporized ammonia. Additionally, the conduit from the ammonia vaporizer outlet to the ammonia-consuming device can be short to further mitigate ammonia condensation.

Effective and consistent NOx reduction to a controlled level without over-supply of ammonia relies on a controlled quantity of ammonia being supplied to the ammonia-consuming device (e.g., an SCR reactor). By using a dedicated ammonia vaporizer to supply ammonia to a given ammonia-consuming device, one can conveniently control the quantity of liquid ammonia solution to the vaporizer, ensure that all liquid is vaporized in the vaporizer, and substantially all ammonia is then delivered to the ammonia-consuming device in vapor state. The quantity of liquid ammonia solution can be determined according to the quantity of ammonia to be consumed in the ammonia-consuming device, and adjusted and regulated by using sensors, controlled valves, meters, pumps, and the like, when needed.

One may be tempted to use a centralized ammonia vaporizer to produce a centralized vaporized ammonia source stream, and then provide separate streams thereof to the multiple ammonia-consuming devices, much similar to the arrangement of the CVMS in this disclosure described above. This could presumably result in the reduction of numbers of vaporizers and ammonia delivery subsystems and the redundant equipment in each of them. While this solution may be useful where the quantity of ammonia supplied to an ammonia-consuming device is allowed to fluctuate broadly, it is not desirable in aspects having an ammonia-consuming device which utilizes a controlled quantity of ammonia. Providing multiple separate streams of vaporized ammonia streams comprising ammonia at consistently and/or precisely controlled quantities, the vaporization medium and water vapor from a source stream produced from a centralized ammonia vapor is very difficult at the operation temperature and pressure. The increase or decrease of flow rate in one of the multiple streams can affect the flow rate of one or more of other streams, and hence the operations of other ammonia-consuming devices. The temperature, pressure, flow rate, and ammonia concentration in the source stream can fluctuate. Precise measurement and control of the temperature and pressure of each of the multiple vaporized ammonia streams are difficult. The pipelines required from the centralized ammonia vaporizer to the multiple ammonia-consuming devices can vary greatly in length depending on its distance from the centralized ammonia vaporizer, with the longer ones prone to heat loss and associated, highly undesirable condensation which can result in reduction or unpredictability of quantity of ammonia supplied to the ammonia-consuming device. Thus, to supply a controlled quantity of ammonia to the individual ammonia-consuming devices, such as furnaces equipped with SCR units for the purpose of abating NOx to a controlled level, it is highly desired that a dedicated ammonia vaporizer is used for each ammonia-consuming device.

III. The Ammonia-Consuming Devices

Ammonia-consuming devices receive ammonia and consume ammonia in a chemical or physical process. An example of an ammonia-consuming device is a furnace comprising a catalytic reactor adapted for receiving ammonia for the purpose of reducing NOx contained in the exhaust gas produced from fuel burning in the furnace.

An exemplary catalytic reactor includes a selective catalytic reduction ("SCR") bed to reduce NOx into diatomic nitrogen and water. For example, ammonia can be mixed into the exhaust stream from a furnace. In the presence of catalysts in SCR bed, the ammonia acts as a reducing agent. Merely for purpose of explanation and not limitation, the following reactions may occur on contact with the SCR catalyst bed:

$$4NO+4NH_3+O_2 \rightarrow N_2+6H_2O \quad (1)$$

$$6NO+4NH_3 \rightarrow 5N_2+6H_2O \quad (2)$$

$$2NO_2+4NH_3+O_2 \rightarrow 3N_2+6H_2O \quad (3)$$

$$6NO_2+8NH_3 \rightarrow 7N_2+12H_2O \quad (4)$$

$$NO+NO_2+2NH_3 \rightarrow 2N_2+3H_2O \quad (5)$$

In some preferred embodiments, the vaporized ammonia stream and the NOx-containing exhaust stream can be mixed or entrained with each other upstream of the SCR bed. The mixture then passes through the SCR bed to effect the reduction reactions to abate the NOx from the mixture stream. In other instances, a portion of the vaporized ammonia stream supplied from the vaporizer can be supplied directly to the SCR bed in the pathway of the NOx-containing exhaust stream to be treated, where it mixes with NOx on contact with the catalyst to reduce the NOx.

Figure 5:
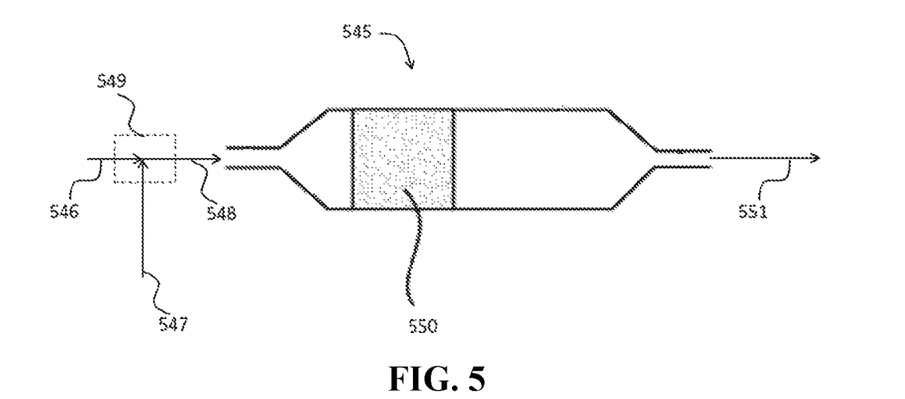
FIG. 5 schematically illustrates an SCR reactor suitable for use in conjunction with the processes and systems described herein that utilize a CVMS.

FIG. 5 schematically illustrates an exemplary ammonia-consuming device, specifically an SCR reactor 545, suitable for use in conjunction with the processes and systems described herein that utilize a CVMS. In FIG. 5, the NOx-containing exhaust stream 546 and the vaporized ammonia stream 547 premix to form a reactant stream 548, which is then introduced into the SCR reactor 545. Premixing can be by entraining the two streams 546 and 547 or by introducing both into a mixer 549, which may include blades or fans to facilitate mixing.

The reactant stream 548 flows through a catalyst bed 550 contained in the SCR reactor 545. The NOx and ammonia react with the catalyst to produce water and diatomic nitrogen according to one or more of the reactions above resulting in a treated exhaust stream 551 comprising NOx at a concentration meeting the regulatory requirements. Desirably, substantially all of the ammonia supplied into the ammonia-consuming device is consumed and converted into other chemical species, desirably nitrogen gas and water. The treated exhaust stream can then be released into the atmosphere, for example through a stack.

The flow rate of the NOx-containing exhaust stream 546 and the NOx concentration in the stream 546, to the extent they are substantially predetermined, predictable, or otherwise known, can be used alone or in combination to determine the quantity of ammonia required for consumption. This in turn can be used to determine and/or control the quantity of aqueous ammonia solution required to be supplied to the ammonia vaporizer. Alternatively, one can use sensor and instruments to measure the concentration of NOx in the exhaust gas stream upstream of the SCR bed, determine the quantity of ammonia required for consumption to abate the NOx to a desired level, and supply the desired quantity of aqueous ammonia solution to the vaporizer, and then to the exhaust gas stream upstream of the SCR bed to effect the desired NOx abatement. Such sensor measurement, quantity computation, solution delivery, and other operations can be advantageously automated by using computers and computer-controlled actuators such as pumps, meters, valves, and the like.

The SCR reactor 545 can be operated, e.g., at a temperature in a range from 150 to 400° C. and a pressure in a range from 100 to 150 kPa. Heat exchangers (not shown) can be used to maintain the reactant stream 548 and/or the SCR reactor 545 at operational temperatures.

The catalyst bed 550 can include catalyst(s) formed of powders, pellets, particles, washcoated, or formed monoliths such as a honeycomb structure, and the like to allow the reactant stream 548 to contact the catalyst within the SCR reactor 545.

Exemplary catalysts suitable for use in the exemplary SCR reactor 545 include one or more metals such as tungsten, cobalt, vanadium, nickel, palladium, platinum, ruthenium, rhenium, iron, copper, silver, indium, gallium, and tin. The metal(s) are typically supported on a structure like an activated-carbon, alumina, titania, or a zeolite (e.g., ZSM-5, ZSM-57, USY, MCM-41, or Beta). An exemplary catalyst includes zeolite catalyst 223 loaded with, for example, about 6 wt % vanadium and about 4 wt % tungsten. Another exemplary catalyst includes the zeolite catalyst 223 loaded with about 6 wt % cobalt and about 4 wt % tungsten.

Generally, SCR reactors 545 are designed to allow for periodic catalyst replacement (not shown here).

The SCR reactor 545 illustrated can be a single-stage, two-stage or multiple-stage SCR reactor. A two-stage SCR reactor typically runs at lower temperatures than a one-stage SCR reactor, e.g., at temperatures in a range from 175 to 250° C.).

IV. Furnaces

Non-limiting examples of equipment that produce NOx-containing exhaust streams include internal combustion engines, boiler furnaces, hydrocarbon steam-cracking furnaces, coal, gas and oil-fired steam boilers for electric power plants, process heaters, incinerators, coal-fired utility boilers, glass furnaces, cement kilns, oil field steam generators, catalyst regenerators associated with FCC units, and so forth.

While the CVMS of this disclosure can be used in a facility or plant operating two or more furnaces, it is preferably used in a facility or plant operating five or more furnaces each with a corresponding ammonia-consuming device. In some instances, a facility or plant using multiple furnaces can use two or more CVMS where each CVMS supplies two or more, preferably five or more, furnaces with corresponding ammonia-consuming devices.

Thermal cracking or pyrolysis of hydrocarbon feeds, such as thermal cracking hydrocarbon feeds in the presence of steam ("steam cracking"), is a commercially important technology for producing light olefins such as ethylene, propylene, and butadiene. Typical hydrocarbon feeds include, e.g., one or more of ethane and propane, naphtha, heavy gas oils, crude oil, etc. Thermal cracking furnaces generally include a radiant section containing at least one heat transfer tube and at least one burner for heating the hydrocarbon feed. When the heat transfer tubes in the radiant section are arranged in coils, it is typical to call these "radiant coils".

In one conventional thermal cracking process, a hydrocarbon and steam mixture is indirectly heated in at least one radiant section heat transfer tube ("radiant tube"), primarily by the transfer of heat from one or more burners to the radiant tube's exterior surface, e.g., radiant heat transfer from flames and high temperature flue gas produced in one or more burners, radiant heat transfer from the interior surfaces of a firebox enclosure, convective heat transfer from combustion gases traversing the radiant section, etc. The transferred heat rapidly raises the temperature of the hydrocarbon feed to the desired coil outlet temperature (COT), which typically ranges from about 1450° F. (788° C.) for some very heavy gas oil feeds to about 1650° F. (871° C.) or even 1700° F. (927° C.) for ethane or propane feeds. Fuel such as natural gas and air is supplied to the one or more burners where the combustion of the fuel provides the radiant heat required for the cracking inside the radiant tubes. The high-temperature combustion of the fuel with air results in the formation of NOx in the exhaust gas stream in the furnace as discussed earlier in this disclosure. The NOx is typically reduced by a stream of vaporized ammonia injected into the exhaust stream upstream of a SCR unit installed in the pathway of the exhaust gas stream. To effectively and consistently abate NOx concentration in the exhaust stream to permitted low level, controlled quantity of ammonia supplied to the furnace exhaust stream is highly desired. A steam cracker facility typically comprise a bank of at least five of such cracking furnaces each equipped with a SCR bed. Thus, the CVMS of this disclosure is particularly useful in supplying controlled quantities of ammonia to the plurality of cracking furnaces.

Heat transferred to the hydrocarbon feed located in one or more of the radiant tubes results in thermal cracking of at least a portion of the hydrocarbon to produce a radiant coil effluent comprising molecular hydrogen, light olefin, other hydrocarbon byproducts, unreacted steam (if the thermal cracking is steam cracking), and unreacted hydrocarbon feed. Transfer line piping is typically utilized for conveying radiant coil effluent from the radiant section to a quenching stage. Coke accumulates during the thermal cracking on internal surfaces of the radiant tubes. After an undesirable amount of coke has accumulated, a flow of decoking mixture, typically an air-steam mixture, is substituted for the hydrocarbon/steam mixture for removing accumulated coke. Decoking effluent is conducted away. Following coke removal, the flow of hydrocarbon feed is restored to the decoked tubes. The process continues, with alternating pyrolysis (thermal cracking) mode and decoking mode. The radiant tubes experience significant mechanical stress as they expand and contract between the alternating cracking and decoking process modes. The tubes experience even more mechanical stress when a furnace shutdown/startup is required.

Selectivity to light olefins during pyrolysis mode is favored by short contact time, high temperatures, and low hydrocarbon partial pressures. For this reason, radiant tubes typically operate at a temperature (measured at the tube metal) as high as 2050° F. (1121° C.).

The combustion conditions in the furnace during the decoking mode and the pyrolysis mode differ significantly, resulting in very different concentration of NOx in the exhaust gas from the combustion chamber. To effectively abate the NOx in the exhaust gas at the SCR bed to the desirable level without over-supply of ammonia, the total quantity of ammonia supplied to the exhaust gas stream need to be adjusted and controlled precisely when furnace operation mode changes. Typically, during the decoking mode, less NOx is produced and therefore less ammonia is required. The total quantity of NOx and NOx concentration in the exhaust gas from a given furnace at different operation modes can be determined empirically or measured by using NOx sensors. For a given hydrocracking furnace operating steadily under a particular condition in a particular mode, the NOx concentration in the exhaust gas and the exhaust gas stream flow rate can be known values. The total quantity of ammonia and flow rate of the vaporized ammonia stream required to reduce NOx concentration in the exhaust gas stream to a predetermined level can be precisely calculated accordingly. In the process and system of this disclosure, because individual ammonia vaporizer is used for each furnace, the total quantity of ammonia and concentration thereof in the vaporized ammonia stream supplied to a furnace can be easily adjusted and precisely controlled by adjusting the components of the ammonia supply subsystem as described above (e.g., the pump for delivering aqueous ammonia to the ammonia vaporizer). Adjustment and control of the quantity of ammonia supplied to the exhaust gas stream can be conveniently conducted by adjusting and control of the quantity of aqueous ammonia solution supplied to the individual ammonia vaporizer with or without changing the temperature, pressure or flow rate of the vaporization medium supplied from the CVMS, as long as the vaporization medium stream supplied to the individual ammonia vaporizer is sufficient to vaporize all aqueous ammonia supplied to the vaporizer, and carry the vaporized ammonia stream to the furnace without condensation. Thus, the process and system of this disclosure is particularly useful for furnaces adapted for working under different modes such as a hydrocarbon cracking furnaces. Because each furnace has a dedicated ammonia vaporizer, changing the quantity of ammonia supplied to one furnace does not affect the quantity of ammonia supplied to another furnace, allowing furnaces at the same facility operating under changing conditions to operate without causing interference to other furnaces connected to the same CVMS. Therefore, the process and system of this disclosure are particularly advantageous for use in facilities having multiple ammonia-consuming devices operating under changing conditions or modes, such as a hydrocarbon cracking plant.

Conversely, in a comparative system where a centralized ammonia vaporizer is used to vaporize a given quantity of ammonia, and multiple streams of vaporized ammonia are produced from the centralized ammonia vaporizer and supplied to multiple ammonia-consuming devices such as furnaces, adjustment and precise control of the quantities of ammonia to all furnaces can be difficult. In such system, adjustment of ammonia supplied to one furnace is normally effected by adjusting the flow rate and/or pressure of the vaporized ammonia stream supplied to it. Precise pressure measurement without causing highly undesirable condensation of the stream is difficult. Thus a centralized ammonia vaporizer has difficulty supplying precise and predictable quantity of needed ammonia to a furnace designed to operate in multiple modes requiring different ammonia supply to abate the different quantities of NOx in the exhaust has to the satisfactory level. Because multiple vaporized ammonia streams are produced from a common, centralized ammonia vaporizer, the fluctuation of flow rate in one stream causes the fluctuation of flow rate of other streams from the same ammonia vaporizer. This results in interference of NOx abatement operations between and among the multiple furnaces connected to the same centralized ammonia vaporizer, which is highly undesirable. Therefore, such comparative system using a centralized ammonia vaporizer is not preferred for hydrocarbon cracking plants comprising multiple furnaces adapted for operating in different modes. Moreover, if a centralized ammonia vaporizer is used, it is highly likely that the pipes connecting the centralized ammonia vaporizer to the multiple furnaces would have varying lengths. The longer pipes would be more prone to condensation, further leading to unpredictable and inconsistent quantities of ammonia supplied to the furnaces. The pipes with different lengths respond differently to fluctuation of pressure caused by adjustment of one vaporized ammonia stream supplied to one furnace, amplifying the interference of operations between and among the furnaces connected to the same centralized ammonia vaporizer. The different pipes with different length, different turns, different insulation, and different ammonia supply targets would have to be painstakingly tuned separately for each mode, all resulting in much higher complexity, unpredictability and inconsistency, and hence narrower operation window, compared to the process and system of this disclosure.

V. Exemplary System

Figure 6:
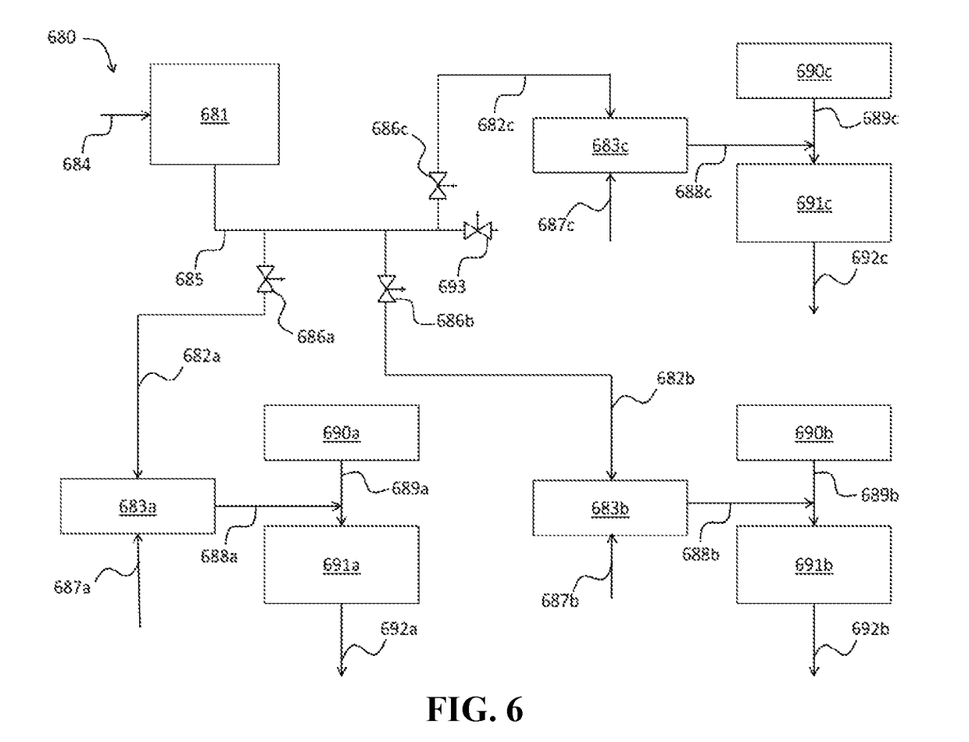
FIG. 6 schematically illustrates an exemplary system of this disclosure that utilizes a CVMS to supply separate streams of vaporization medium to multiple ammonia vaporizers.

FIG. 6 schematically illustrates an exemplary system 680 of this disclosure that utilizes a CVMS 681 to supply multiple separate streams of vaporization medium such as 682a, 682b, and 682c to corresponding multiple ammonia vaporizers such as 683a, 683b, and 683c.

A vaporization medium source stream 684 (e.g., comprising ambient air, compressed air, high-pressure steam, or super-high-pressure steam) is supplied to the CVMS 681. The CVMS 681 changes the temperature and/or pressure of the vaporization medium source stream 684 to produce a vaporization medium stream 685 suitable for vaporizing ammonia. The CVMS 681 can be exemplary CVMS 215 of FIG. 2, exemplary CVMS 330 of FIG. 3, exemplary CVMS 440 of FIG. 4, or a variation thereof.

The vaporization medium stream 685 is distributed to the separate streams of vaporization medium 682a, 682b, and 682c, which are supplied to the corresponding ammonia vaporizers 683a, 683b, and 683c. Valves 686a, 686b, and 686c can be included along the conduits used to distribute the vaporization medium stream 685. The valves 686a, 686b, and 686c can be used to control the flow of the separate streams of vaporization medium 682a, 682b, and 682c. Additionally, the valves 686a, 686b, and 686c can be used to isolate the downstream equipment from the CVMS 681, which allows for continuing continuous operation of the CVMS 681 while performing other operations on downstream equipment. For example, if a furnace needs to be shut down to be maintained, the corresponding equipment like an ammonia vaporizer downstream of the CVMS can be turned off while the CVMS continues to supply vaporization medium to the other ammonia vaporizers in the system 680.

Additionally, a CVMS vent 694 can optionally be included in the system 680 in parallel with the ammonia vaporizers 683a, 683b, and 683c. The CVMS vent 694 facilitates warming of the CVMS 681 and upstream conduits that distribute the vaporization medium stream 685. Then, the CVMS 681 can supply the ammonia vaporizers 683a, 683b, and 683c with vaporization medium at the proper temperature and pressure without having to flush through the ammonia vaporizers 683a, 683b, and 683c.

The separate streams of vaporization medium 682a, 682b, and 682c supply vaporization medium to the corresponding ammonia vaporizers 683a, 683b, and 683c. Additionally, each of the ammonia vaporizers 683a, 683b, and 683c is supplied with an aqueous ammonia solution via an ammonia supply stream 687a, 687b, and 687c. As described previously herein, each ammonia supply stream 687a, 687b, and 687c can be treated (e.g., filter and/or entrained with nitrogen) and flow controlled to ensure a controlled quantity of ammonia is supplied to each of the ammonia vaporizers 683a, 683b, and 683c. The ammonia vaporizers 683a, 683b, and 683c, in turn, produce corresponding vaporized ammonia streams 688a, 688b, and 688c.

The vaporized ammonia streams 688a, 688b, and 688c are mixed with NOx-containing exhaust streams 689a, 689b, and 689c from furnaces 690a, 690b, and 690c (e.g., steam cracking furnace 655 of FIG. 6). As illustrated, mixing of the vaporized ammonia streams 688a, 688b, and 688c and corresponding NOx-containing exhaust streams 689a, 689b, and 689c can occur before introduction to a corresponding ammonia-consuming device 691a, 691b, and 691c, optionally in a mixer (not illustrated). Alternatively, as described in FIG. 5, the vaporized ammonia streams 688a, 688b, and 688c and corresponding NOx-containing exhaust streams 689a, 689b, and 689c can be supplied to the ammonia-consuming devices 691a, 691b, and 691c at different locations where mixing occurs in the ammonia-consuming devices 691a, 691b, and 691c upstream of the catalyst.

As described in FIG. 5, the ammonia and NOx can react in the presence of the catalyst in the ammonia-consuming device 691a, 691b, and 691c to produce a treated exhaust stream 692a, 692b, and 692c.

While FIG. 6 illustrates only three separate ammonia vaporizers 683a, 683b, and 683c each with a corresponding, designated ammonia-consuming device 691a, 691b, and 691c and a corresponding furnace 690a, 690b, and 690c, a CVMS 681 of this disclosure can be used in systems and processes with any number of separate ammonia vaporizers (e.g., 2-20, preferably 5-12), which reduces components required to operate the system 680 and, consequently, reduces equipment capital costs and saves plant space. The valve 693 can be connected to additional ammonia vaporizer or be a vent valve for venting the vaporization medium stream 685 in case its pressure becomes too high.

Valves, pressure meters, sensors, and the like can be placed anywhere suitable within the system 680 or subsystems thereof to ensure proper functioning of the system 680. For example, the system 680 can include at least one sensor capable of sensing the concentration of NOx in the NOx-containing gas stream upstream and/or downstream of one or more ammonia-consuming devices 691a, 691b, and 691c (e.g., SCR catalyst bed); and at least one actuator in a corresponding ammonia delivery subsystem adapted for controlling the quantity of ammonia supplied to the ammonia-consuming devices 691a, 691b, and 691c according to the concentration of NOx sensed by the at least one sensor.

What is claimed is:

1. A process for delivering controlled quantities of ammonia to multiple ammonia-consuming devices, the process comprising:
(I) supplying a vaporization medium from a centralized vaporization medium subsystem;
(II) providing a separate ammonia vaporizer for each of the ammonia-consuming devices;

(III) supplying a separate stream of vaporization medium from the centralized vaporization medium subsystem to each of the ammonia vaporizers;
(IV) supplying an ammonia supply stream comprising a controlled quantity of ammonia to each of the ammonia vaporizers;
(V) obtaining a vaporized ammonia stream from each of the ammonia vaporizers; and
(VI) supplying one of the vaporized ammonia stream to one of the ammonia-consuming devices.

2. The process of claim 1, wherein:
in step (III), the stream of vaporization medium comprises air, steam, or a mixture thereof.

3. The process of claim 1, wherein the stream of vaporization medium has a temperature in a range from 150 to 400° C. and an absolute pressure in a range from 138 to 1482 kPa.

4. The process of claim 1, wherein:
the centralized vaporization medium subsystem comprises (i) at least one air blower or at least one regulator connected to a compressed air source and (ii) at least one heater, and the step (III) comprises:
(III.1) obtaining an air stream from the air blower or the regulator;
(III.2) heating the air stream at the heater to obtain a source stream of heated air; and
(III.3) supplying a separate stream of heated air divided from the source stream heated air as the separate stream of vaporization medium to each of the ammonia vaporizers.

5. The process of claim 4, wherein the centralized vaporization medium subsystem further comprises (i) at least two air blowers in which at least one is a backup air blower and at least two heaters in which at least one is a backup heater; and/or (ii) at least two regulators connected to the compressed air source in which at least one is a backup regulator.

6. The process of claim 1, wherein:
the vaporization medium comprises steam, and the step (III) comprises:
(III.1) supplying a stream of high-pressure steam or super-high-pressure steam; and
(III.2) passing the stream of high-pressure steam or super-high-pressure steam through a regulator to reduce the temperature and/or pressure of the stream of high-pressure steam to obtain a source stream of steam; and
(III.3) supplying a separate stream of steam divided from the source stream of steam as the separate stream of vaporization medium to each ammonia vaporizer.

7. The process of claim 1, wherein:
in the step (IV), the ammonia supply stream comprises liquid pure ammonia or an aqueous ammonia solution, and optionally nitrogen.

8. The process of claim 7, wherein the ammonia supply stream comprises an aqueous ammonia solution having an ammonia concentration in a range from 10 wt % to 29 wt %, based on the total weight of ammonia and water therein.

9. The process of claim 7, wherein the ammonia supply stream is supplied into the ammonia vaporizer through an atomizer.

10. The process of claim 7, wherein the step (IV) comprises:
(IV.1) supplying a liquid stream comprising ammonia; and
(IV.2) supplying a nitrogen gas stream into the liquid stream to obtain the ammonia supply stream.

11. The process of claim 1, wherein:
Each of the ammonia-consuming devices comprises a selective catalytic reduction ("SCR") catalyst bed for reducing NOx in a NOx-containing gas stream passing through the SCR catalyst bed; and
at least a portion of the vaporized ammonia stream is supplied to the NOx-containing gas stream upstream of the SCR catalyst bed.

12. The process of claim 11, wherein the NOx-containing gas stream is produced by burning of fuel in a furnace.

13. The process of claim 12 wherein the furnace is a boiler furnace or a hydrocarbon steam-cracking furnace.

14. The process of claim 11, further comprising:
providing at least one sensor capable of sensing the concentration of NOx in the NOx-containing gas stream upstream and/or downstream of the SCR catalyst bed; and
controlling the quantity of ammonia in the ammonia supply stream in step (IV) according to the NOx concentration sensed by the at least one sensor.

15. The process of claim 11, further comprising:
operating at least one of the ammonia-consuming devices in different modes producing the NOx-containing stream with different NOx concentrations; and
supplying different quantities of ammonia to the NOx-containing stream in different modes to abate the NOx to predetermined levels.

16. A system comprising:
(A) a centralized vaporization medium subsystem;
(B) multiple ammonia-consuming devices;
(C) a separate ammonia vaporizer for each of the ammonia-consuming devices adapted for (i) receiving a separate stream of the vaporization medium from the centralized vaporization medium subsystem, (ii) receiving an ammonia supply stream from an ammonia source, and (iii) supplying a vaporized ammonia stream to one of the ammonia-consuming device; and
(D) an ammonia-delivery subsystem for delivering a controlled quantity of ammonia from the ammonia. supply stream to each of the ammonia vaporizers.

17. The system of claim 16, wherein the centralized vaporization medium subsystem comprises at least one air blower or a regulator connected to a compressed air source adapted for supplying an air stream and at least one heater adapted for heating the air stream to obtain a source stream of a vaporization medium, and the separate stream of the vaporization medium for each of the ammonia-consuming devices is obtained from the source stream of the vaporization medium.

18. The system of claim 16, wherein the centralized vaporization medium subsystem comprises (i) at least two air blowers in which at least one is a backup air blower or at least two regulator in which at least one is a backup regulator; and (ii) at least two heaters in which at least one is a backup heater.

19. The system of claim 16, wherein:
the centralized vaporization medium subsystem comprises at least one regulator adapted for reducing the temperature and/or pressure of a stream of high-pressure steam or super-high-pressure steam to obtain a source stream of steam, and the separate stream of the vaporization medium for each of the ammonia-consuming devices is obtained from the source stream of steam.

20. The system of claim 19, wherein the centralized vaporization medium subsystem comprises at least two regulators in which at least one is a backup regulator.

21. The system of claim 16, wherein:
the ammonia-delivery system further comprises a conduit for supplying nitrogen gas into the ammonia supply stream and/or an atomizer at the inlet to the ammonia vaporizer.

22. The system of claim 16, wherein:
each of the ammonia-consuming devices comprises a selective catalytic reduction ("SCR") catalyst bed for reducing NOx in a NOx-containing gas stream passing through the SCR catalyst bed; and
the fluid communication between the ammonia vaporizer and the ammonia-consuming device is set up in a manner such that at least a portion of the vaporized ammonia stream is supplied to the NOx-containing gas stream upstream of the SCR catalyst bed.

23. The system of claim 22, the NOx-containing gas stream is from a furnace.

24. The system of claim 23, wherein the furnace is a boiler furnace or a hydrocarbon steam-cracking furnace capable of operating in different modes.

25. The system of claim 16, further comprising:
at least one sensor capable of sensing the concentration of NOx in the NOx-containing gas stream upstream and/or downstream of the SCR catalyst bed; and
at least one actuator in the ammonia delivery subsystem adapted for controlling the quantity of ammonia supplied to the ammonia vaporizer according to the concentration of NOx sensed by the at least one sensor.

\* \* \* \* \*